United States Patent
Ota et al.

(10) Patent No.: US 6,343,540 B1
(45) Date of Patent: Feb. 5, 2002

(54) PISTON INSTALLING METHOD AND POSITIONING JIG

(75) Inventors: Masaki Ota; Masanori Sonobe; Tomoji Tarutani; Ryo Matsubara; Kenta Nishimura; Hirotaka Kurakake, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/592,725

(22) Filed: Jun. 13, 2000

(30) Foreign Application Priority Data

Jun. 16, 1999 (JP) .............................. 11-169815

(51) Int. Cl.$^7$ .......................... F01B 29/00; B25B 27/14
(52) U.S. Cl. ........................................ 92/128; 29/281.5
(58) Field of Search ........................... 92/128; 29/281.5

(56) References Cited

U.S. PATENT DOCUMENTS

| | | | | |
|---|---|---|---|---|
| 4,197,627 A | * | 4/1980 | Hirabayashi et al. ...... | 29/281.5 |
| 5,237,739 A | * | 8/1993 | Clark ..................... | 29/281.5 X |
| 5,369,878 A | * | 12/1994 | Tsuji et al. ............ | 29/281.5 X |
| 5,884,906 A | * | 3/1999 | Morse ..................... | 269/266 |
| 6,209,444 B1 | * | 4/2001 | Murakami et al. ......... | 92/71 |

FOREIGN PATENT DOCUMENTS

| | | |
|---|---|---|
| JP | 8-219012 | 8/1996 |
| JP | 9-310677 | 12/1997 |
| JP | 10-159725 | 6/1998 |
| JP | 10-318129 | 12/1998 |

\* cited by examiner

*Primary Examiner*—John E. Ryznic
(74) *Attorney, Agent, or Firm*—Morgan & Finnegan, LLP

(57) ABSTRACT

The present invention discloses a method for installing pistons in cylinder bores formed in a cylinder block of a compressor. The piston on one end of the cylinder block and a positioning jig on the other end of the cylinder block are arranged. The positioning jig is inserted into the cylinder bore such that part of the positioning jig protrudes from the cylinder bores toward the piston. The protruding part of the positioning jig is engaged with the piston to determine the position of the piston. The piston is inserted into the cylinder bore while maintaining the engagement between the jig and the piston. The positioning jig is removed from the cylinder bore. This facilitate automation of installation of pistons in cylinder bores.

18 Claims, 9 Drawing Sheets

PISTON INSTALLING METHOD AND POSITIONING JIG

BACKGROUND OF THE INVENTION

The present invention relates to a method for installing pistons in a piston type compressor that compresses refrigerant gas in a vehicle air conditioner. Particularly, the present invention pertains to a method for installing pistons in cylinder bores and a positioning jig used for the method.

FIG. 8 illustrates a compressor. The compressor has a front housing member 101 and a cylinder block 102. The front housing member 101 is secured to the front face of the cylinder block 102 to define a crank chamber 103. A drive shaft 104 extends through the crank chamber 103 and is supported by the front housing member 101 and the cylinder block 102. A swash plate 105 is coupled to the drive shaft 104 to rotate integrally with the drive shaft 104.

Cylinder bores 106 are formed in the cylinder block 102. Each cylinder bore 106 receives a single headed piston 107. Each piston 107 is coupled to the swash plate 105 by shoes 108. The compressor performs a compression cycle. In the compression cycle, rotation of the drive shaft 104 is converted to reciprocation of the pistons 107 by the swash plate 105 and the shoes 108. Accordingly, refrigerant gas is drawn in to each cylinder bore 106 and is compressed in the cylinder bore 106. Compressed refrigerant gas is then discharged from the cylinder bore 106.

FIG. 9 illustrates a step in the assembly process of the compressor. Specifically, FIG. 9 shows a step for installing the pistons 107 into the cylinder bores 106. The pistons 107 are first coupled to the swash plate 105 to form a piston assembly Pa. A positioning jig 111 holds the pistons 107 at its circumferential position to align the axis L2 of each piston 107 with the axis N2 of the corresponding cylinder bore 106.

In this state, the piston assembly Pa and the cylinder block 102 are brought closer to each other along the axes L1 (or N1) of the piston assembly Pa and the cylinder block 102 such that each piston 107 is inserted into the corresponding cylinder bore 106 to a predetermined position. When the pistons 107 starts entering the cylinder bores 106, the jig 111 is disengaged from the pistons 107. This is because the jig 111 is no longer necessary and will hinder the further insertion of the pistons 107.

The jig 111 is formed by separable members that are moved in the radial direction to release the pistons 107. The jig 111 may be an integrated member that is moved in the direction of the axis L1 to release the pistons 107.

As illustrated by dotted lines in FIG. 9, a wall 109, which defines the crank chamber 103, extends from the cylinder block 102 in some compressors. In such a compressor, the pistons 107 cannot be installed by using the jig 111. That is, the jig 111 interferes with the wall 109 before the pistons 107 reach the cylinder bores 106. The piston assembly Pa therefore cannot be moved closer to the cylinder block 102. Thus, it is difficult to automate the installation of the pistons 107 in a compressor if the wall 109 extends by a significant axial distance from the cylinder block 102. In this case, the pistons 107 must be manually installed, which increases the costs.

If the diameter of the wall 109 is increased such that the jig 111 does not interfere with the wall 109, the pistons 107 can be installed by the jig 111. In other words, the assembly of the pistons 107 can be automated. However, the increased diameter of the wall 109 increases the size of the compressor. Since the compressor is located in a vehicle engine compartment, in which a number of other auxiliary components are located, the size of the compressor must be as small as possible.

SUMMARY OF THE INVENTION

Accordingly, it is an objective of the present invention to provide a method and a positioning jig that facilitate automation of installation of pistons in cylinder bores.

To achieve the above objective, the present invention provides a method for installing a piston in a cylinder bore formed in a cylinder block of a fluid machine. The method includes arranging the piston on one end of the cylinder block and a positioning jig on the other end of the cylinder block, inserting the positioning jig into the cylinder bore such that part of the positioning jig protrudes from the cylinder bore toward the piston, engaging the protruding part of the positioning jig with the piston to determine the position of the piston, inserting the piston into the cylinder bore while maintaining the engagement between the jig and the piston, and removing the positioning jig from the cylinder block.

The present invention further provides a positioning jig used for installing a piston in a cylinder bore formed in a cylinder block. The jig comprises a positioning member. The positioning member is inserted into the cylinder bore and protrudes from the cylinder bore. The positioning member determines the position of the piston. A positioning projection is located substantially on the axis of the positioning member. When a distal end surface of the positioning member is pressed against a corresponding end surface of the piston, the positioning projection is inserted into a recess formed substantially on the axis of the piston to align the axis of the piston with the axis of the cylinder bore.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Piston type variable displacement compressors according to first to third embodiments of the present invention will now be described. In the descriptions of the second and third embodiment, the differences from the first embodiment will be discussed.

Figure 1:
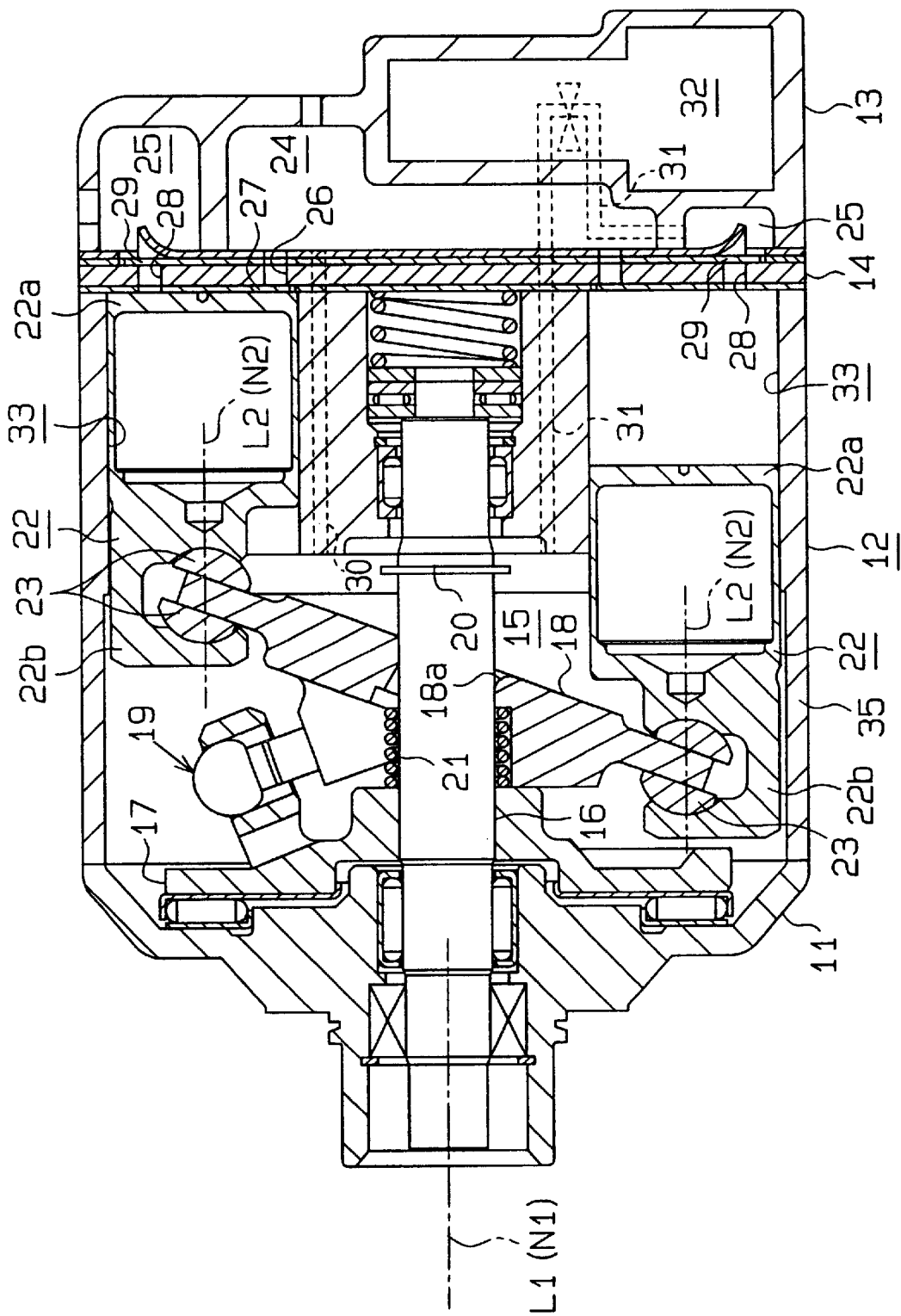
FIG. 1 is a cross-sectional view illustrating a piston type variable displacement compressor.

The left end of the compressor in FIG. 1 is defined as the front of the compressor, and the right end is defined as the rear of the compressor. As shown in FIG. 1, a front housing member 11 is secured to the front end face of a cylinder block 12. A rear housing member 13 is secured to the rear end face of the cylinder block 12, and a valve plate 14 is located between the rear housing member 13 and the rear end face of the cylinder block 12. A crank chamber 15 is defined by the front housing member 11 and the cylinder block 12. A drive shaft 16 extends through the crank chamber 15 and is rotatably supported by the front housing member 11 and the cylinder block 12.

A cylindrical wall 35 is integrally formed with the cylinder block 12 to define the crank chamber 15 about the axis L1 of the drive shaft 16.

A lug plate 17 is secured to the drive shaft 16 in the crank chamber 15. A drive plate, which is a swash plate 18 in this embodiment, is accommodated in the crank chamber 15. A through hole 18a is formed in the center of the swash plate 18 to receive the drive shaft 16. A hinge mechanism 19 connects the lug plate 17 and the swash plate 18.

The swash plate 18 slides along and inclines with respect to the axis L1 of the drive shaft 16. As the radial center of the swash plate 18 slides toward the cylinder block 12, the inclination of the swash plate 18 decreases. As the radial center of the swash plate 18 slides toward the lug plate 17, the inclination of the swash plate 18 increases.

A stopper ring 20 is fixed to the drive shaft 16 between the swash plate 18 and the cylinder block 12. Abutment of the swash plate 18 against the stopper ring 20 prevents the swash plate 18 from moving beyond a predetermined minimum inclination. The minimum inclination of the swash plate 18 is slightly more than zero degrees. Abutment of the swash plate 18 against the lug plate 17 prevents the swash plate 18 from moving beyond a predetermined maximum inclination. A spring 21 is fitted about the drive shaft 16 and is located between the lug plate 17 and the swash plate 18. The spring 21 urges the radial center of the swash plate 18 toward the cylinder block 12, or in a direction to decrease the inclination of the swash plate 18.

Cylinder bores 33 are formed in the cylinder block 12. The cylinder bores 33 are arranged at equal angular intervals about the axis L1 of the drive shaft 16. Each cylinder bore 33 reciprocally houses a single-headed piston 22. Each piston 22 has a head 22a accommodated in the associated cylinder bore 33 and a skirt 22b coupled to the swash plate 18 by shoes 23. Rotation of the drive shaft 16 causes the swash plate 18 to move back and forth. The movement of the swash plate 18 is transmitted to the pistons 22 by the shoes 23. Accordingly, the head 22a of each piston 22 reciprocates in the associated cylinder bore 33.

A suction chamber 24 and a discharge chamber 25 are defined in the rear housing member 13. Suction ports 26, suction valve flaps 27, discharge ports 28 and discharge valve flaps 29 are formed in the valve plate 14.

The drive shaft 16 is rotated by an external drive force such as a vehicle engine, which reciprocates the pistons 22.

When moved from the top dead center to the bottom dead center, each piston 22 draws refrigerant gas from the suction chamber 24 to the associated cylinder bore 33 via the associated suction port 26 and the associated suction valve flap 27. Refrigerant gas in each cylinder bore 33 is compressed to reach a predetermined pressure as the associated piston 22 is moved from the bottom dead center, to the top dead center and is discharged to the discharge chamber 25 via the associated discharge port 28 and the associated discharge valve flap 29.

The crank chamber 15 is connected to the suction chamber 24 by a bleeding passage 30. The discharge chamber 25 is connected to the crank chamber 15 by a supply passage 31. A displacement control valve 32 is located in the supply passage 31. The control valve 32 adjusts the opening size of the supply passage 31 to change the pressure in the crank chamber 15. This changes the difference between the pressure of the crank chamber 15 and the pressure in the cylinder bores 33 both of which are applied to each side of the pistons 22. Accordingly, the inclination of the swash plate 18, or the displacement of the compressor, is varied.

A method for assembling the compressor of FIG. 1, particularly, a method for installing the pistons 22 in the cylinder bores 33, will now be described.

Figure 2:
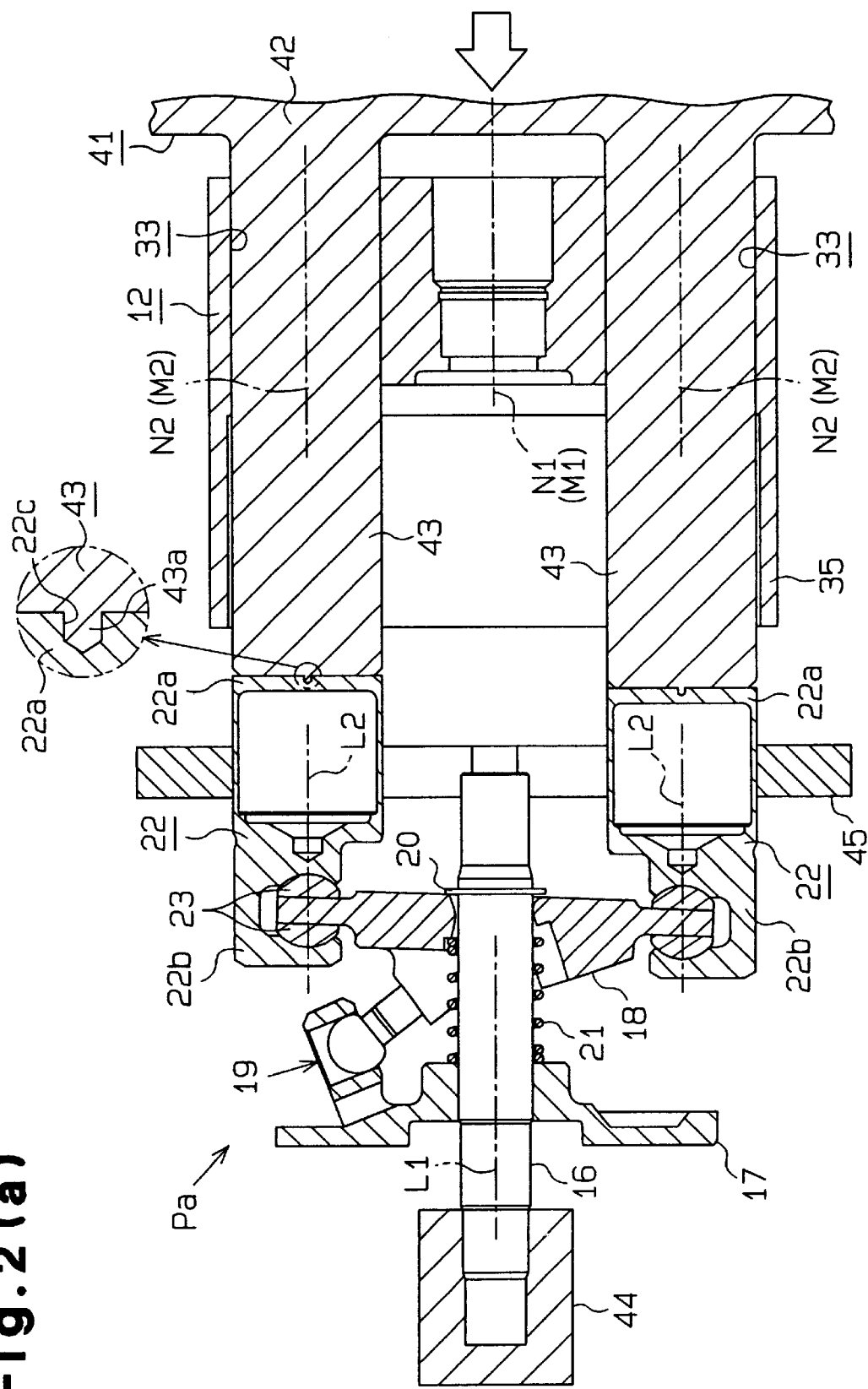
FIG. 2(a) is a cross-sectional view showing a procedure for installing pistons.
FIG. 2(b) is an enlarged partial view of FIG. 2(a)
Figure 3:
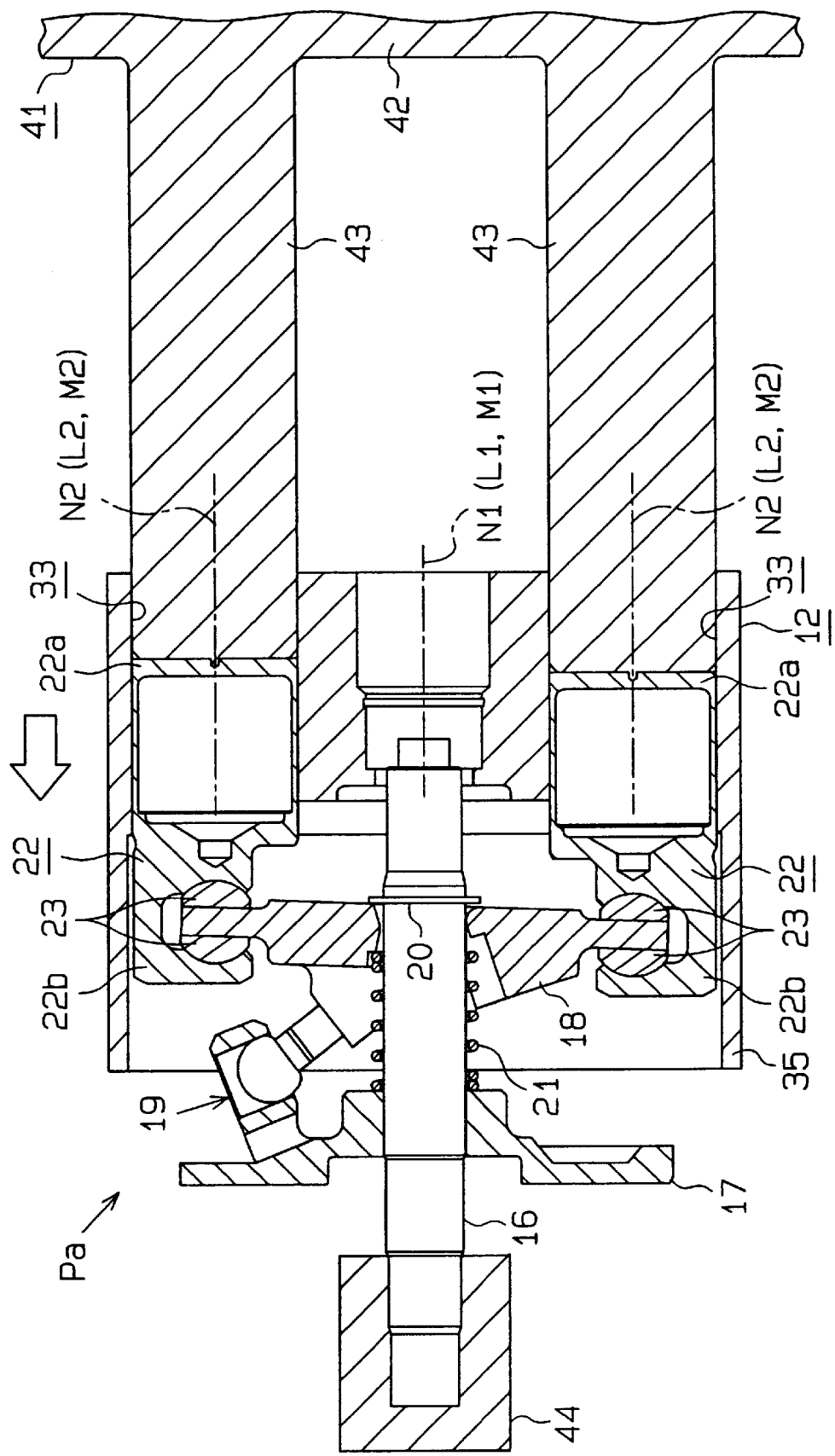
FIG. 3 is a cross-sectional view showing a procedure for installing pistons.

Once the pistons 22 are installed in the cylinder bores 33, the position of the pistons 22 cannot be freely adjusted. This makes it troublesome to connect the shoes 23 and the swash plate 18 to the pistons 22 afterwards. Thus, in this embodiment, a piston assembly Pa is assembled prior to installing the pistons 22 in the cylinder bores 33. As shown in FIGS. 2(a) and 3, the piston assembly Pa includes the lug plate 17, the swash plate 18, the hinge mechanism 19, the stopper ring 20 and the spring 21, which are assembled on the drive shaft 16. Also, the pistons 22 are coupled to the swash plate 18 by the shoes 23 as shown in FIGS. 2(a) to 3.

As shown in FIG. 2(a), the inclination of the swash plate 18 in the piston assembly Pa is minimized by the force of the spring 21. That is, the swash plate 18 contacts the stopper ring 20. Since the minimum inclination of the swash plate 18 is more than zero degrees, the positions of the pistons 22 are different from one another. For example, the upper piston 22 as viewed in FIG. 2(a) is at the top dead center position, while the lower piston 22 is at the bottom dead center position.

A positioning jig 41 includes a base 42 and cylindrical positioning shafts 43. The number of the shafts 43 corresponds to the number of the cylinder bores 33. The shafts 43 are angularly spaced equally from one another along a circle centered on the axis M1 of the base 42. The diameter of each shaft 43 is substantially equal to that of each cylinder bore 33. The axial dimensions, or the length along the axis M2, of the shafts 43 vary in accordance with the stroke position of each piston 22 in the piston assembly Pa. That is, the closer to the top dead center position one of the pistons 22 is, the shorter the length of the corresponding shaft 43 is.

A positioning projection 43a is formed on the distal end of each shaft 43. Each projection 43a is located in the center, or on the axis M2, of the corresponding shaft 43. A positioning recess 22c is formed in the distal end of each piston head 22a. Each recess 22c is located at the center, or on the axis L2, of the corresponding piston 22.

First, the piston assembly Pa and the cylinder block 12 are set at initial positions in an automatic assembling apparatus, which includes the positioning jig 41. Specifically, the drive shaft 16 is held by a shaft holder 44 and the pistons 22 are held by a piston holder 45. The piston holder 45 has the same structure as the positioning jig 111 described in the prior art section. That is, the piston holder 45 is formed by separable members that are moved in the radial direction to release the pistons 22. The piston holder 45 may be an integrated member that is moved in the direction of the axis L1 to release the pistons 22. The cylinder block 12 is located a predetermined distance from the piston assembly Pa. The positioning jig 41 is first located at a predetermined distance from the cylinder block 2. In this state, the axis L1 of the drive shaft 16, the axis N1 of the cylinder block 12 and the axis M1 of the jig 41 are aligned. Also, the axis L2 of each piston 22, the axis N2 of the corresponding cylinder bore 33 and the axis M2 of the corresponding positioning shaft 43 are aligned. Since the axial dimension of each shaft 43 corresponds to the position of the corresponding piston 22, the distance between the end face of the piston head 22a of the piston 22 and the distal end of the shafts 43 are equal when the piston assembly Pa, the cylinder block 12 and the jig 41 are in their initial positions.

The jig 41 is moved along the axis M1 from the initial position to a position shown in FIG. 2(a). That is, the shafts 43 are inserted into the cylinder bores 33 from the side opposite to the side through which the pistons 22 are inserted. The distal end of each shaft 43 protrudes from the front end of the cylindrical wall 35 toward the piston assembly Pa and the distal end of each shaft 43 is pressed against the corresponding piston head 22a. In this state, each positioning projection 43a is fitted in the corresponding positioning recess 22c.

Accordingly, the position of each piston 22 relative to the cylinder bores 33 is determined. Specifically, contact between the distal end of each piston 22 and the distal end of the corresponding shaft 43 prevents the axes L2 and N2 of the piston 22 and the cylinder bore 33 from becoming misaligned. Engagement of the projection 43a of each shaft 43 with the recess 22c of the corresponding piston 22 aligns axes L2 and N2 with each other.

Once the position of each piston 22 is determined prior to the installation, the piston holder 45 is removed from the pistons 22. This is because the holder 45 is not necessary after the position of each piston 22 is determined by engagement of the piston 22 and the jig 41. Then, the cylinder block 12 is moved toward the piston assembly Pa along the axis N1 as shown in FIG. 3 to insert the head 22a of each piston 22 into the corresponding cylinder bore 33. At the same time, the jig 41 is moved relative to the cylinder block 12 such that the shafts 43 are moving out of the rear side of the cylinder block 12.

When the piston heads 22a are moved to a predetermined positions in the cylinder bores 33, the cylinder block 12 is stopped. Then, the jig 41 is moved away from the cylinder block 12 along the axes M1 and N1 to completely remove the shafts 43 from the cylinder bores 33. The installation of the pistons 22 in the cylinder bores 33 is thus completed.

The embodiment shown in FIGS. 1 to 3 has the following advantages.

Before inserting the pistons 22 into the cylinder bores 33, the position of the pistons 22 relative to the cylinder bores 33 is determined by the positioning jig 41, part of which is located in and part of which protrudes from the cylinder bores 33. After the pistons 22 are inserted in the cylinder bores 33, the jig 41 is removed from the cylinder bores 33 from the side opposite to the side through which the pistons 22 are inserted. The jig 41 does not interfere with the wall 35 that forms the crank chamber 15. Therefore, the installation of the pistons 22 is easily automated without increasing the size of the wall 35, or the size of the compressor, which reduces manufacturing costs.

Figure 9:
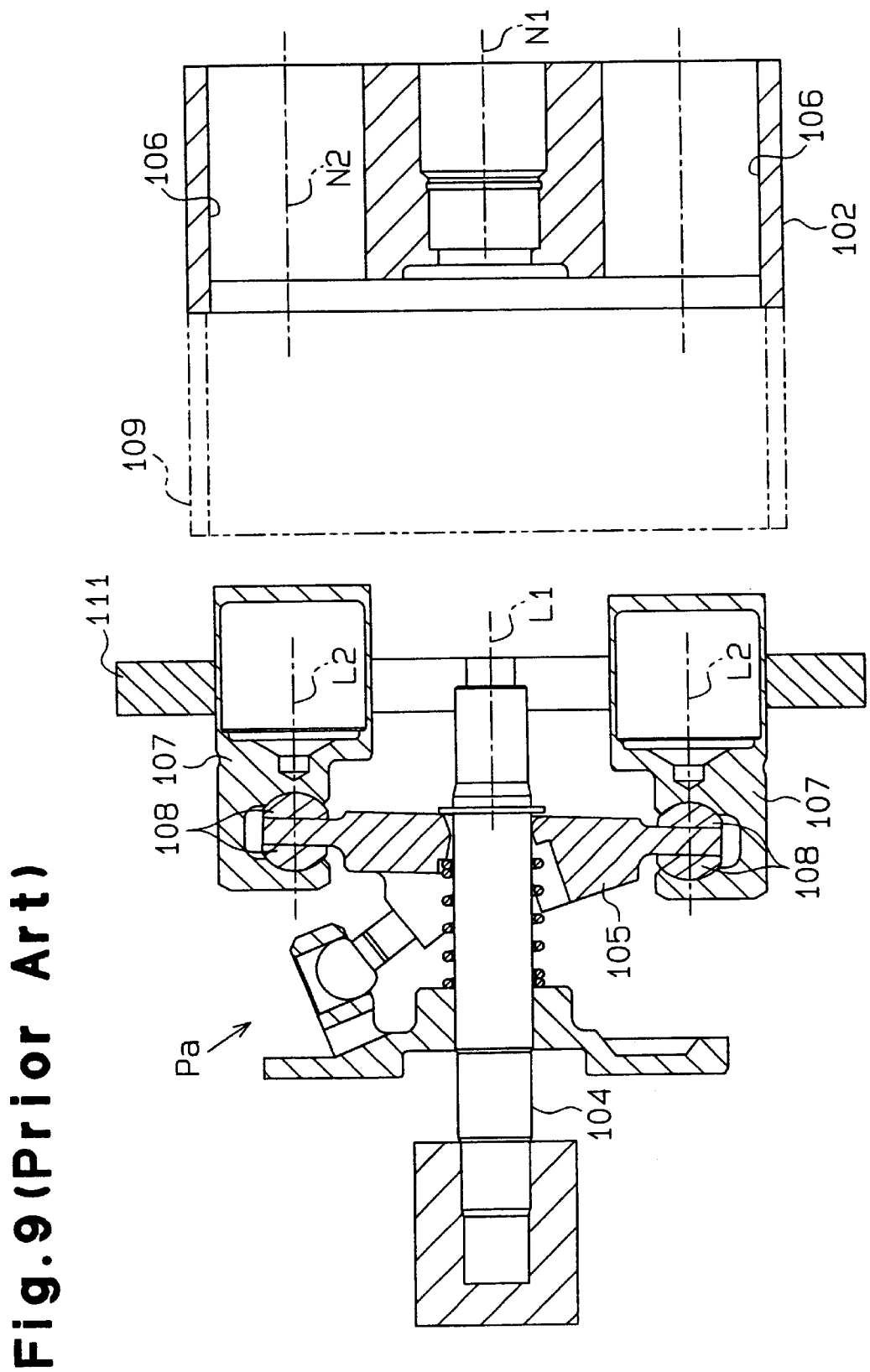
FIG. 9 is a cross-sectional view illustrating a prior art procedure for installing pistons.

In the prior art compressor illustrated in FIG. 9, the piston assembly Pa is assembled with the cylinder block 102 such that each piston 107 is installed in the corresponding cylinder bore 106. Thereafter, the jig 111 is disengaged from the pistons 107. At this time, the jig 111 may interfere with the swash plate 105. In the present invention, however, the jig 41 is disengaged from the piston assembly Pa without interfering with the swash plate 18, which facilitates automation of installation of the pistons 22 in cylinder bores 33.

When the position of each piston 22 is determined by the jig 41, the piston holder 45 is easily removed from the pistons 22. Therefore, the present invention is particularly effective in the compressor shown in FIG. 1, in which the wall 35 is integral with the cylinder block 12.

The piston assembly Pa includes the stopper ring 20 and the spring 21. The spring 21 presses the swash plate 18 against the stopper ring 20, which puts the swash plate 18 at the minimum inclination position. The position of the swash plate 18 is stable in this state. Therefore, when installing the piston assembly Pa, the swash plate 18 need not be directly held. In other words, the piston assembly Pa is stable when held by a relatively few jigs, which are the shaft holder 44 and the piston holder 45. This reduces manufacturing costs.

When the compressor is stopped, the spring 21 moves the swash plate 18 to the minimum inclination position. When the compressor is started again, the displacement of the compressor is minimized, which minimizes the torque. The shock caused by starting the compressor is thus reduced.

Figure 4:
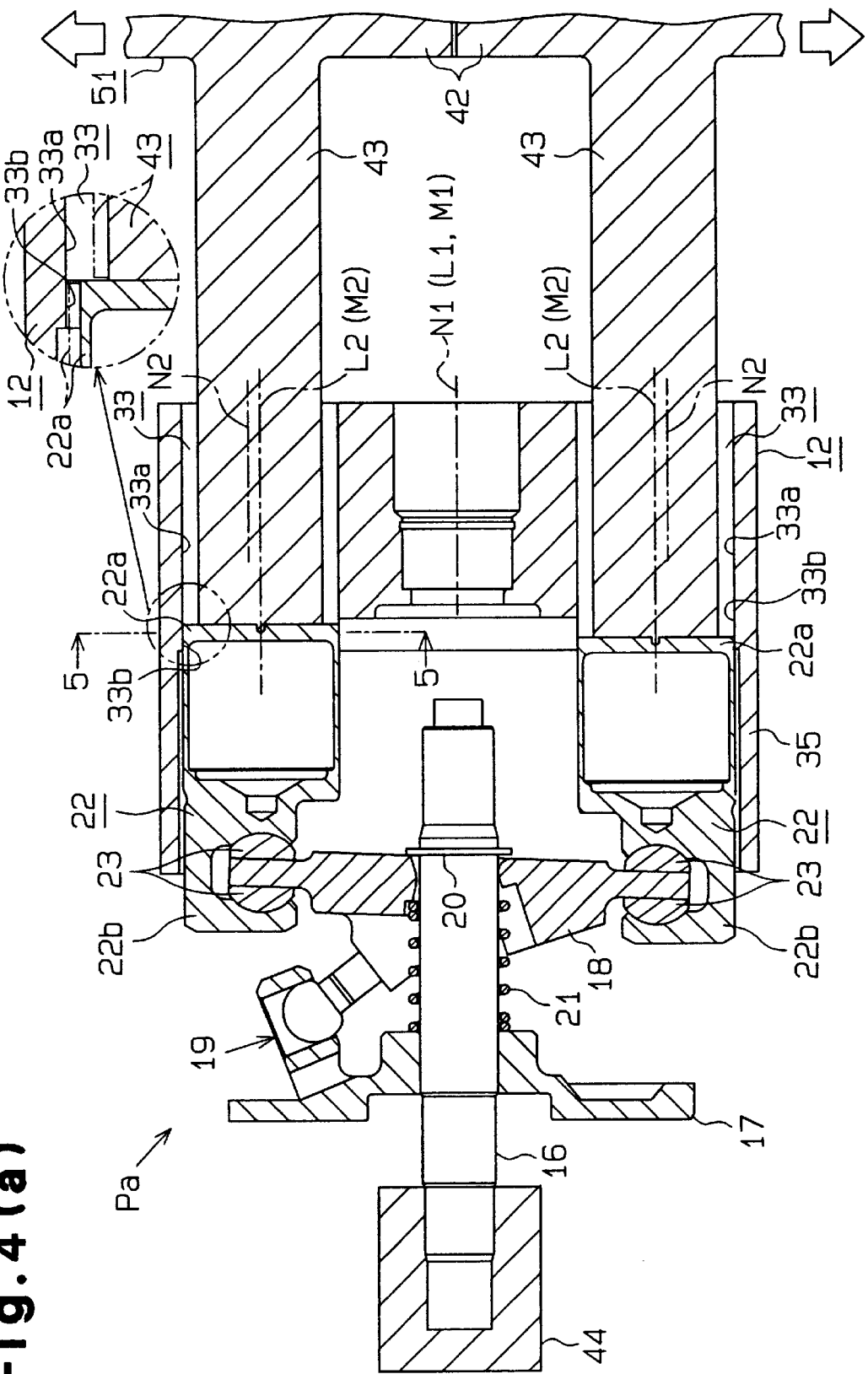
FIG. 4(a) is a cross-sectional view showing a procedure or installing pistons according to a second embodiment.
FIG. 4(b) is an enlarged partial view of FIG. 4(a)

A positioning jig 51 according to a second embodiment will now be described with reference to FIGS. 4(a) to 5. The base 42 of the jig 51 is divided into pieces as shown in FIG. 4. Each piece of the base corresponds to one of the shafts 43. The diameter of each shaft 43 is smaller than that of the cylinder bore 33. Therefore, each shaft 43 is movable in a direction perpendicular to the axes M2 and N2 in the corresponding cylinder bore 33. Part of the inner surface 33a of the cylinder bore 33 that is nearer to the outer circumferential side of the cylinder block 12 functions as a positioning surface 33b. As shown in FIG. 4(b), each positioning surface 33b extends into the crank chamber 15.

When the cylinder block 12 and the piston assembly Pa are at their initial positions in an automatic assembling apparatus, which includes the positioning jig 51, the axis L2 of each piston 22 is aligned with the axis M2 of the corresponding shaft 43. However, the axes L2 and M2 are offset to the axis N2 of the corresponding cylinder bore 33 away from the corresponding positioning surface 33b, or toward the axis N1 of the cylinder block 12. In FIG. 4(a), the offset is exaggerated for purposes of illustration. From the initial positions, the piston assembly Pa and the cylinder block 12 are moved in the same manner as the embodiment of FIGS. 1 to 3 such that each projection 43a is fitted to the corresponding recess 22c.

When the cylinder block 12 is moved such that the piston head 22a of each piston 22 is radially aligned with the corresponding positioning surface 33b as shown in FIGS. 4(a) and 4(b), each piece of the jig 51 is moved outward in a direction perpendicular to the axis M1, or toward the corresponding positioning surface 33b. Therefore, as shown by broken lines in FIGS. 4(b) and 5, the head 22a of each piston 22, which is engaged with and held by the corresponding positioning shaft 43, is pressed against the corresponding positioning surface 33b. Accordingly, the axis L2 of the piston 22 is aligned with the axis N2 of the corresponding cylinder bore 33. Thereafter, the pistons 22 are installed in the cylinder bores 33 in the same manner as the embodiment of FIGS. 1 to 3.

Figure 5:
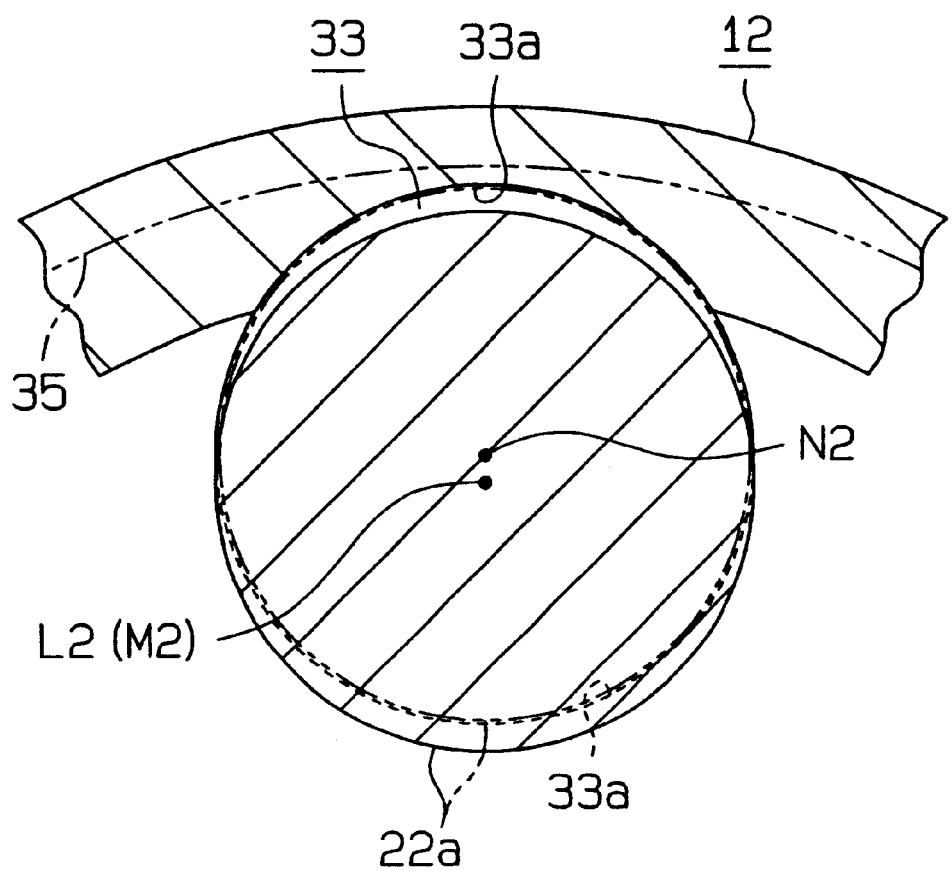
FIG. 5 is a cross-sectional view taken along line 5—5 of FIG. 4(a)

The embodiment of FIGS. 4(a) to 5 has the same advantages as the embodiment of FIGS. 1 to 3. Further, tolerances in the diameter of each positioning shaft 43 and the tolerances in the projections 43a and the recesses 22c do not significantly influence the positioning accuracy between the pistons 22 and the cylinder bores 33. That is, since the measurements of the head 22a of each piston 22 and the inner surface 33a of each cylinder bore 33, which includes the positioning surface 33b, are highly accurate, the relative position of each piston 22 and the corresponding cylinder bore 33 is accurately determined. Therefore, even if the diameter of each shaft 43 and the position and measurement of the projections 43a and the recesses 22c are not highly accurate, the pistons 22 are accurately installed in the cylinder bores 33. Accordingly, manufacturing costs are reduced.

A third embodiment will now be described with reference to FIGS. 6 and 7. In the compressor of the embodiments shown in FIGS. 1 to 5, each piston 22 can rotate about its axis L2. As a result, the skirt 22b of the piston 22 may interfere with the swash plate 18 when the swash plate 18 is rotating at a high rate, which produces noise.

Figure 6:
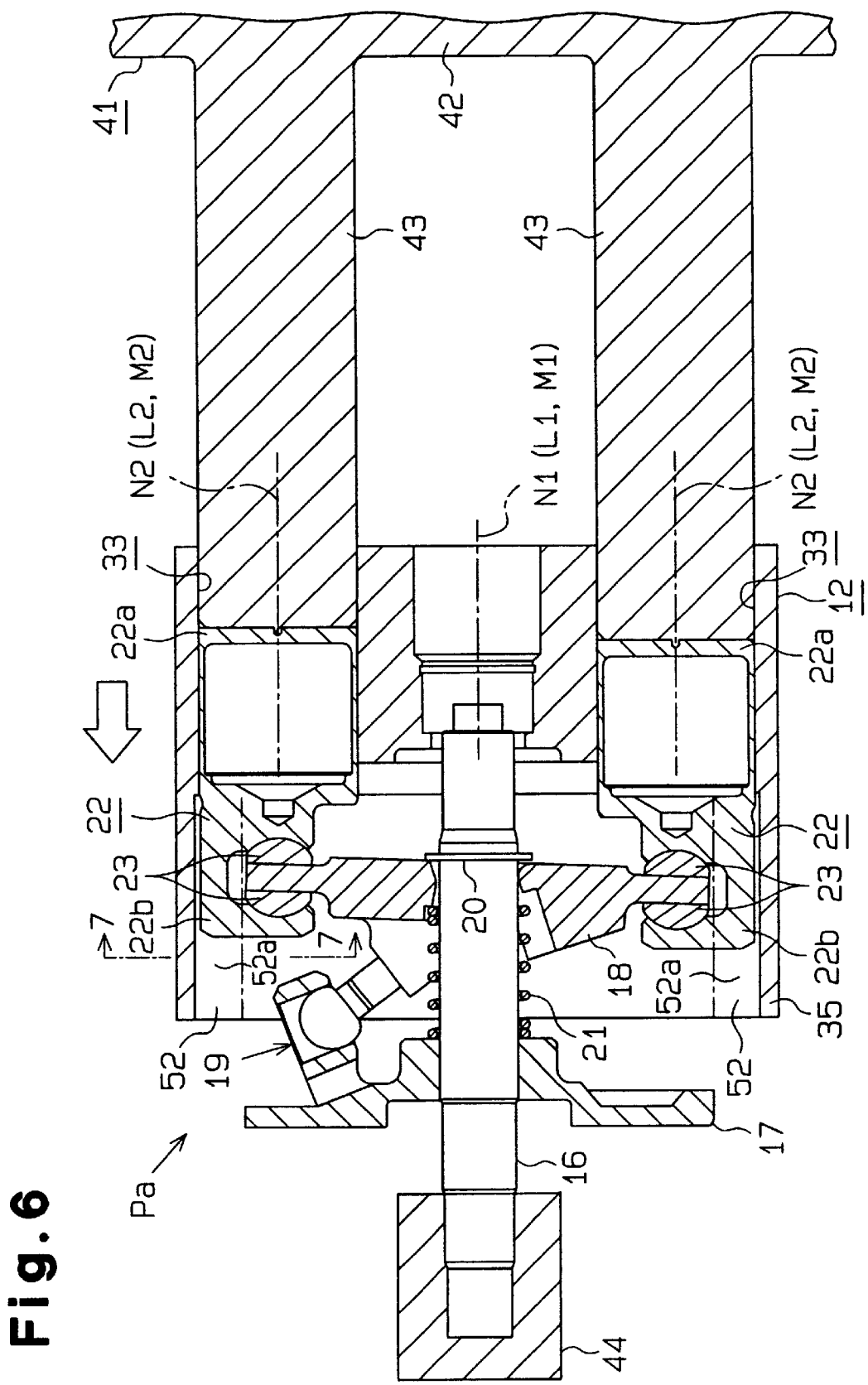
FIG. 6 is a cross-sectional view showing a procedure for installing pistons according to a third embodiment.
Figure 7:
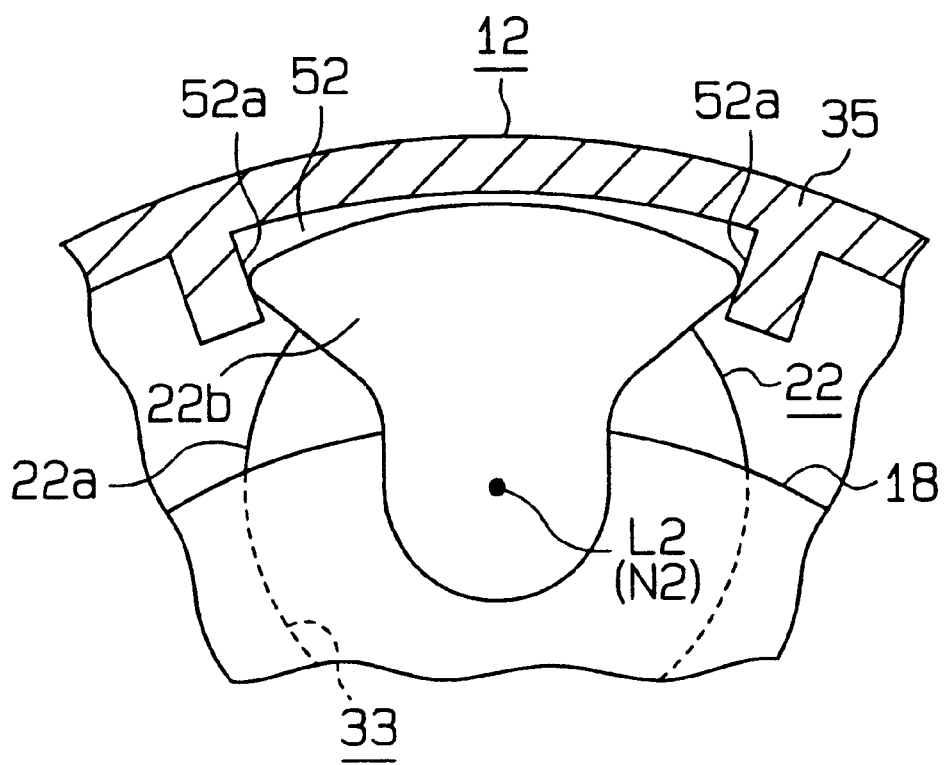
FIG. 7 is a cross-sectional view taken along line 7—7 of FIG. 6(a)

The compressor shown in FIGS. 6 and 7 has a structure for preventing each piston 22 from rotating about the axis L2. That is, rotation restrictors, which are restriction recesses 52 in this embodiment, are formed in the inner surface of the cylindrical wall 35. Each recess 52 extends from the front end of the wall 35 to the vicinity of the corresponding cylinder bore 33. The skirt 22b of each piston 22 is located in the corresponding recess 52. When the piston 22 reciprocates, the recess 52 guides the skirt 22b in the direction of the axes L2 and N2. Even if a rotating force acts on the piston 22, contact between the skirt 22b and the side walls 52a of the recess 52 prevents the piston 22 from rotating . The skirt 22b therefore does not interfere with the swash plate 18.

The wall 35 of the compressor shown in FIGS. 6 and 7 extends from the cylinder block 12. Therefore, when inserting the piston heads 22a into the cylinder bores 33, the skirt 22b of each piston 22 is engaged with the corresponding recess 52. In other words, when installing the pistons 22 using the jig 41, each recess 52 guides the skirt 22b of the corresponding piston 22 along the axis L2, which stabilizes the rotational position of the piston 22 and thus facilitates the insertion of the piston 22 into the corresponding cylinder bore 33. From a different viewpoint, if a rotation restrictor (recesses 52) is formed in the wall 35, integrating the wall 35 with the cylinder block 12 allows the pistons 22 to be accurately and easily installed in the cylinder bores.

Figure 8:
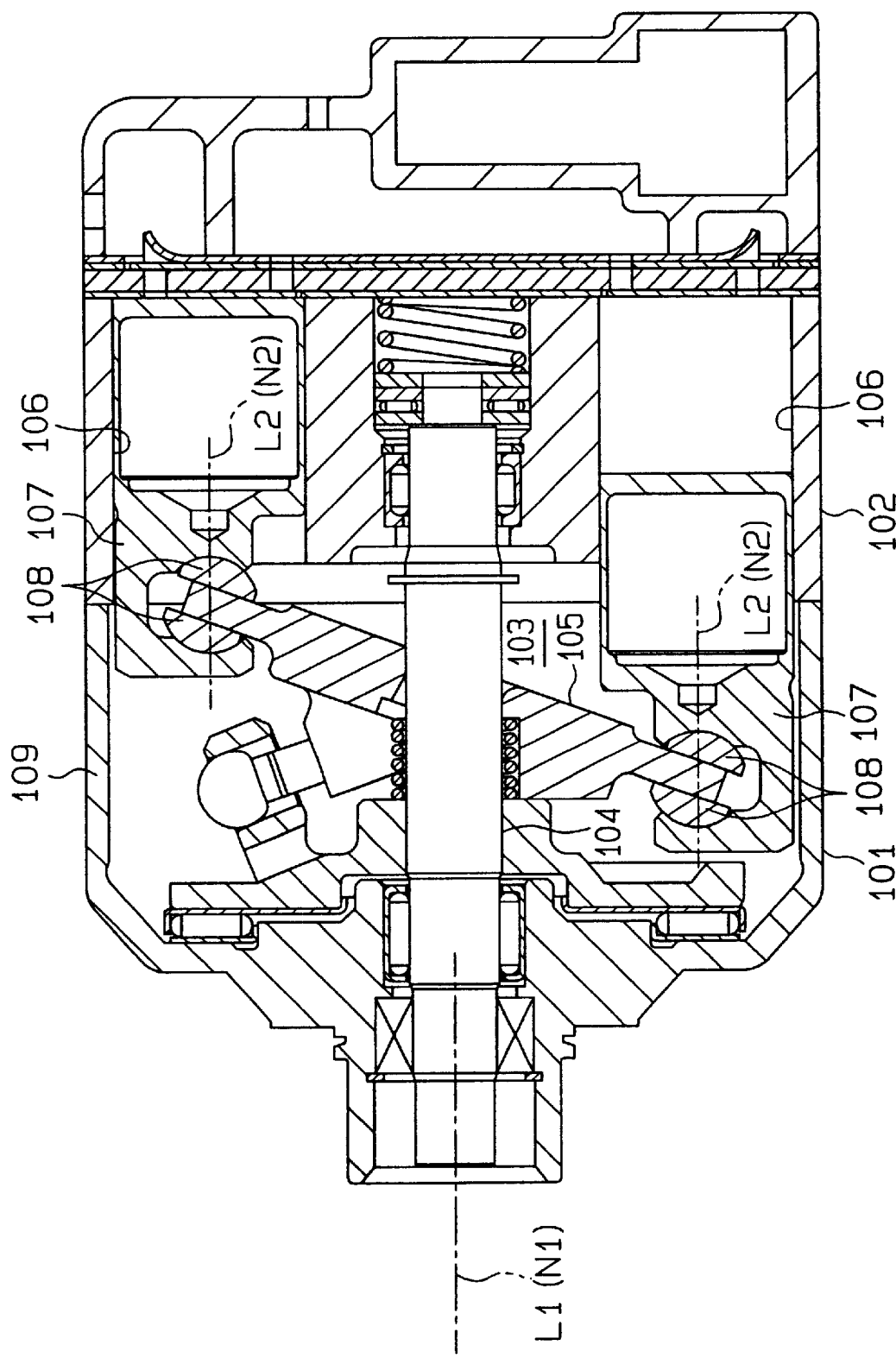
FIG. 8 is a cross-sectional view illustrating a prior art piston type variable displacement compressor.

The illustrated embodiments may be modified as follows.
The illustrated embodiments may be applied to the compressor shown in FIGS. 8 and 9.

In the illustrated embodiment, the spring 21 may be omitted and a spring that urges the swash plate 18 toward the maximum inclination position, or toward the lug plate 17, may be used. In the piston assembly Pa, the swash plate 18 contacts the lug plate 17 by the force of the spring, which stables the position of the swash plate 18. Therefore, the embodiment of the spring urging the swash plate 18 toward the maximum inclination position has the same advantages as the embodiment of FIGS. 1 to 3. The spring maximizes the inclination of the swash plate 18 when the compressor is stopped. When the compressor is started again, the compressor displacement is maximum, which permits the compressor to quickly respond to a great cooling load.

In the embodiment of FIGS. 6 and 7, the relationship between each piston skirt 22b and the corresponding recess 52 may be reversed. That is, a recess may be formed in the skirt 22b and a corresponding projection may be formed on the surface of the wall 35.

The illustrated embodiments may be employed in a method in which pistons are installed in cylinder bores without forming a piston assembly.

The illustrated embodiments may be employed in a method for installing double-headed pistons in a compressor.

The illustrated embodiments may be employed in fluid machines other than piston type compressors in a vehicle air conditioner. For example, the illustrated embodiments may be employed in methods for assembling piston type hydraulic pumps or internal combustion engines.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A positioning jig used for installing a piston in a cylinder bore formed in a cylinder block, the jig comprising:
   a positioning member, wherein the positioning member is inserted into the cylinder bore and protrudes from the cylinder bore, wherein the positioning member determines the position of the piston;
   a positioning projection located substantially on the axis of the positioning member, wherein, when a distal end surface of the positioning member is pressed against a corresponding end surface of the piston, the positioning projection is inserted into a recess formed substantially on the axis of the piston.

2. A method for installing a piston in a cylinder bore formed in a cylinder block of a fluid machine, the method including:
   arranging the piston on one end of the cylinder block and a positioning jig on the other end of the cylinder block;
   inserting the positioning jig into the cylinder bore such that part of the positioning jig protrudes from the cylinder bore toward the piston;
   engaging the protruding part of the positioning jig with the piston to determine the position of the piston;
   inserting the piston into the cylinder bore while maintaining the engagement between the jig and the piston; and
   removing the positioning jig from the cylinder bore.

3. The method according to claim 2, wherein inserting the piston into the cylinder bore is accomplished by moving the cylinder block axially with respect to the piston.

4. The method according to claim 2, wherein engaging the positioning jig with the piston includes engaging a distal end surface of the positioning jig with an end surface of the piston.

5. The method according to claim 2, wherein engaging the distal end surface of the positioning jig with the end surface of the piston includes engaging a projection formed on the distal end surface of the positioning jig with a recess formed on the end surface of the piston.

6. The method according to claim 2, wherein the piston is located within a cylindrical wall that extends axially from the cylinder block when the piston is being inserted into the cylinder bore, wherein the cylindrical wall defines a crank chamber when the fluid machine is assembled.

7. The method according to claim 6, further including guiding the piston by a restrictor formed in the cylindrical wall when the piston is located within the cylindrical wall, wherein the restrictor engages the piston to prevent the piston from rotating in the cylinder bore when the fluid machine is assembled.

8. The method according to claim 1, further including aligning the axis of the piston with the axis of the cylinder bore before the piston is inserted into the cylinder bore.

9. The method according to claim 8, wherein aligning the axis of the piston with the axis of the cylinder bore includes engaging the peripheral surface of the piston with a guide surface, which extends from a wall defining the cylinder bore.

10. The method according to claim 2, further including:
   installing a drive plate on a drive shaft before the positioning jig is inserted into the cylinder bore; and
   coupling the piston with the drive plate to form an assembly such that the assembly includes the drive shaft, the drive plate and the pistons, wherein the drive plate convert rotation of the drive shaft to reciprocation of the piston.

11. A method for installing pistons in cylinder bores formed in a cylinder block of a compressor, the method including:
   installing a drive plate on a drive shaft;
   coupling the pistons, the number of which corresponds to the number of the cylinder bores, with the drive plate to form an assembly such that the assembly includes the drive shaft, the drive plate and the pistons, wherein the drive plate converts rotation of the drive shaft to reciprocation of the pistons;
   locating the assembly at one end of the cylinder block and a positioning jig at the other end of the cylinder block, wherein the positioning jig has positioning members, the number of which corresponds to the number of the cylinder bores;
   inserting the positioning members into the cylinder bores such that part of each positioning member protrudes from the corresponding cylinder bore;
   engaging the protruding part of the positioning member with the corresponding piston to determine the position of the piston;
   inserting each piston into the corresponding cylinder bore while maintaining engagement between the positioning members and the pistons; and
   removing the positioning members from the cylinder bores.

12. The method according to claim 11, wherein inserting the pistons into the corresponding cylinder bore includes moving the cylinder block axially with respect to the pistons.

13. The method according to claim 11, wherein engaging the positioning member with the pistons includes engaging distal end surfaces of the positioning members with corresponding end surfaces of the pistons.

14. The method according to claim 13, wherein engaging the distal end surfaces of the positioning members with the corresponding end surfaces of the pistons includes engaging projections formed on the distal end surfaces of the positioning members with recesses formed in the corresponding end surfaces of the pistons.

15. The method according to claim 11, wherein the pistons are located within a cylindrical wall that extends axially from the cylinder block when the pistons are inserted into the corresponding cylinder bores, wherein the cylindrical wall defines a crank chamber when the fluid machine is assembled.

16. The method according to claim 15, further including, a guiding the piston by a restrictor formed in the cylindrical wall when the pistons are located within the cylindrical wall, wherein the restrictor engages the corresponding piston to prevent the piston from rotating in the cylinder bore when the fluid machine is assembled.

17. The method according to claim 11, further including aligning the axes of the pistons with the axes of the respective cylinder bores before the piston is inserted into the cylinder bore.

18. The method according to claim 17, wherein aligning the axes of the pistons with the axes of the cylinder bores includes engaging the peripheral surfaces of the pistons with respective guide surfaces, which extend from a wall defining the cylinder bore.

* * * * *

UNITED STATES PATENT AND TRADEMARK OFFICE
CERTIFICATE OF CORRECTION

PATENT NO. : 6,343,540 B1
DATED : February 5, 2002
INVENTOR(S) : Masaki Ota et al.

It is certified that error appears in the above-identified patent and that said Letters Patent is hereby corrected as shown below:

Column 2,
Line 57, please delete "or" and insert therefor -- for --

Signed and Sealed this

Twenty-first Day of May, 2002

Attest:

*Attesting Officer*

JAMES E. ROGAN
*Director of the United States Patent and Trademark Office*